United States Patent [19] [11] Patent Number: 5,036,207
Nakamura et al. [45] Date of Patent: Jul. 30, 1991

[54] RADIATION IMAGE STORAGE PANEL
[75] Inventors: Takashi Nakamura; Yasushi Kojima, both of Kaisei, Japan
[73] Assignee: Fuji Photo Film Co., Ltd., Kanagawa, Japan
[21] Appl. No.: 455,249
[22] Filed: Dec. 22, 1989
[30] Foreign Application Priority Data
Dec. 28, 1988 [JP] Japan ................................ 63-333852
[51] Int. Cl.$^5$ ............................................. G03B 42/00
[52] U.S. Cl. ................... 250/484.1; 250/486.1
[58] Field of Search ................. 250/484.1, 486.1, 327.2
[56] References Cited
U.S. PATENT DOCUMENTS
4,675,271 6/1987 Degenhardt ........................ 430/139
4,780,611 10/1988 Nakamura .......................... 250/327.2

Primary Examiner—Edward P. Westin
Assistant Examiner—James Beyer
Attorney, Agent, or Firm—Sixbey, Friedman, Leedom & Ferguson

[57] ABSTRACT

Disclosed is a radiation image storage panel having a stimulable phosphor layer including a stimulable phosphor which absorbs both a radiation in a wavelength shorter than 250 nm and ultraviolet rays in a wavelength of 250–400 nm, then which stores their energies, and which emits the energies as luminescence when it is exposed to irradiation of a visible light or an infrared ray; and also including a phosphor which spontaneously emits ultraviolet rays in a wavelength of 250–400 nm when it is excited by a radiation in a wavelength shorter than 250 nm. Also there disclosed is another radiation image storage panel having separately a stimulable phosphor layer and an ultraviolet ray emitting phosphor layer including the phosphor which emits ultraviolet rays in a wavelength of 250–400 nm when it is excited by a radiation in a wavelength shorter than 250 nm.

8 Claims, 6 Drawing Sheets

RADIATION IMAGE STORAGE PANEL

FIELD OF THE INVENTION

The present invention relates to a radiation image storage panel employable in a radiation image recording and reproducing method utilizing a stimulable phosphor.

BACKGROUND OF THE INVENTION

As a method replacing a conventional radiography, a radiation image recording and reproducing method utilizing a stimulable phosphor is described, for instance, in U.S. Pat. No. 4,239,968 and is practically used. In the method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at a considerably smaller dose, as compared with the conventional radiography using a combination of a radiographic film and a radiographic intensifying screen. Further, the method is very advantageous from the viewpoints of conservation of resources and economic efficiency because the radiation image storage panel can be repeatedly used in the method, while the radiographic film is consumed for each radiographic process in the conventional radiography.

The radiation image storage panel employed in the above-described method generally comprises a support and a stimulable phosphor layer provided on one surface of the support. However, if the phosphor layer is self-supporting, the support may be omitted.

As the stimulable phosphor layer, there are known not only a phosphor layer comprising a binder and a stimulable phosphor dispersed therein but also a phosphor layer composed of only an agglomerate of a stimulable phosphor, not containing a binder, which is formed through deposition process or sintering process. The present applicant has already applied for patent with respect to a radiation image storage panel having other type of a stimulable phosphor layer in which voids of a stimulable phosphor agglomerate are impregnated with a polymer material (U.S. patent application Ser. No. 184,010). In any of the above-described phosphor layers, the stimulable phosphor emits light (stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photoelectrically detected to give electric signals, so as to reproduce a visible image from the electric signals.

In the case the phosphor layer is provided on a support, a film (i.e., protective film) is generally provided on the free surface (surface not facing the support) of the phosphor layer to protect the phosphor layer from chemical deterioration or physical shock.

When a radiation image storage panel containing a stimulable phosphor is employed in radiography for the medical diagnosis, it is particularly desired that the sensitivity of the panel to a radiation is made as high as possible to reduce the exposure dose for patient and to facilitate the procedure for converting the stimulated emission to electric signals. Accordingly, it is desired to make the sensitivity of the panel as high as possible.

The sensitivity of the radiation image storage panel is essentially determined by the total amount of stimulated emission given by the stimulable phosphor contained therein. The more amount of a radiation the stimulable phosphor absorbs, the more amount of stimulated emission it emits, assuming that the content of the stimulable phosphor is kept at the same level and that its yield of luminescence is constant.

The known and practically used radiation image storage panel absorbs a radiation to the amount of about 60%, and the rest amount (i.e., 40%) of the radiation having useful information for medical diagnosis is not absorbed but passed through the panel. Therefore, in order to improve the sensitivity of a radiation image storage panel, it is desired that the above-mentioned 40% amount of the radiation should be absorbed by the panel as much as possible, and that the efficiency of utilization of a radiation should be improved.

SUMMARY OF THE INVENTION

It is an object of the present invention to provide a radiation image storage panel which has improved sensitivity to a radiation by increasing the efficiency of utilization of a radiation.

There is provided by the present invention a radiation image storage panel having a phosphor layer; including a stimulable phosphor which absorbs both a radiation in a wavelength shorter than 250 nm and ultraviolet rays in a wavelength of 250–400 nm, then which stores their energies, and which emits the energies as luminescence when it is exposed to irradiation of a visible light or an infrared ray; and also including a phosphor which emits ultraviolet rays in a wavelength of 250–400 nm when it is excited by a radiation in a wavelength shorter than 250 nm.

There is also provided by the invention a radiation image storage panel having a stimulable phosphor layer including a stimulable phosphor which absorbs both a radiation in a wavelength shorter than 250 nm and ultraviolet rays in a wavelength of 250–400 nm, then which stores their energies, and which emits the energies as luminescence when it is exposed to irradiation of a visible light or an infrared ray; and also having a layer including a phosphor which emits ultraviolet rays in a wavelength of 250–400 nm when it is excited by a radiation in a wavelength shorter than 250 nm, provided in contact with the bottom surface of said stimulable phosphor layer.

The radiation image storage panel of the present invention has not only a stimulable phosphor which absorbs and stores energies of a radiation in a wavelength shorter than 250 nm and ultraviolet rays in a wavelength of 250–400 nm, but also a phosphor which emits ultraviolet rays when it is excited by the above-mentioned radiation (hereinafter referred to as "an ultraviolet ray emitting phosphor"). Therefore, the rest amount of the radiation, which the stimulable phosphor has not absorbed and stored, can be absorbed by the ultraviolet ray emitting phosphor, and said ultraviolet ray emitting phosphor excited by said radiation emits ultraviolet rays in the above-mentioned wavelength region (i.e., 250–400 nm). As the above-mentioned stimulable phosphor can absorb and store the energy of the ultraviolet ray in the said wavelength region, it can, via the ultraviolet ray emitting phosphor, absorb and store the radiation energy which has not been directly absorbed and stored. Therefore, the efficiency of utilization of a radiation can be improved, and the sensitivity of a radiation image storage panel can be increased.

In the radiation image storage panel of the present invention, the ultraviolet ray emitting phosphor may be contained either in the stimulable phosphor layer together with a stimulable phosphor, or in the layer provided in contact with the bottom surface of the stimulable phosphor layer (hereinafter referred to as "an ultraviolet ray emitting phosphor layer").

In the case of the radiation image storage panel of the present invention in which the ultraviolet ray emitting phosphor is contained in the stimulable phosphor layer together with a stimulable phosphor, said panel can absorb more radiation energy than a known radiation image storage panel whose stimulable phosphor layer dose not contain the ultraviolet ray emitting phosphor, by the amount of the energy which the ultraviolet ray emitting phosphor absorbs, assuming that the amount of the stimulable phosphor contained is kept at the same level. Therefore, the radiation absorption efficiency of the panel of the present invention is improved by adding an ultraviolet ray emitting phosphor to a known stimulable phosphor layer.

Naturally, the absorption efficiency of the panel can be highly improved by using an ultraviolet ray emitting phosphor having high absorption coefficient. Therefore, in the present invention, it is preferred to use an ultraviolet ray emitting phosphor having high absorption coefficient. For example, the X-ray absorption coefficients of the stimulable phosphor GdOCl:Ce and the ultraviolet ray emitting phosphor (Y,Sr)TaO$_4$ are shown in FIG. 6. As is evident from FIG. 6, it is only in an energy region of 50–67 KeV that the X-ray absorption coefficient of GdOCl:Ce is higher than that of (Y,Sr)TaO$_4$, and in other energy region, (Y,Sr)TaO$_4$ phosphor absorbs more X-ray radiation energy than GdOCl:Ce does.

In the case of the radiation image storage panel of the present invention having a ultraviolet ray emitting phosphor layer, which contains an ultraviolet ray emitting phosphor and which is provided in contact with the bottom surface of the stimulable phosphor layer containing a stimulable phosphor, said panel has higher sensitivity than a known radiation image storage panel in which the thickness of the stimulable phosphor layer is the same as the total thickness of the layers (i.e., the phosphor layer and the ultraviolet ray emitting phosphor layer) of the panel of the present invention. The reason of this fact is as follows: Although the amount of radiation energy absorbable by a radiation image storage panel increases with increase of the thickness of the stimulable phosphor layer, the stimulable phosphor located at the deep site of the stimulable phosphor layer contributes by no means to stimulated emission. Because stimulating rays cannot reach and excite the stimulable phosphor located at the deep site of the stimulable phosphor layer, and said stimulable phosphor cannot release the stored energy as stimulated emission.

In the case of the radiation image storage panel of the present invention having a ultraviolet ray emitting phosphor layer, which contains an ultraviolet ray emitting phosphor and which is provided in contact with the bottom surface of the stimulable phosphor layer containing a stimulable phosphor, the radiation which has passed through said stimulable phosphor layer excites the ultraviolet ray emitting phosphor in the ultraviolet emitting phosphor layer, and said ultraviolet ray emitting phosphor emits ultraviolet rays, then the energy of said ultraviolet rays is stored by the stimulable phosphor in stimulable phosphor layer. Thus, the radiation image based on the radiation energy which has once passed through the stimulable phosphor layer can be recorded in said stimulable phosphor layer which the stimulating ray can reach sufficiently. Consequently, the sensitivity of the radiation image storage panel is considerably improved.

DETAILED DESCRIPTION OF THE INVENTION

The radiation image storage panel of the present invention is now described in more detail.

First of all, below described is the stimulable phosphor which constitutes the stimulable phosphor layer of the radiation image storage panel of the present invention, and which absorbs both a radiation in a wavelength shorter than 250 nm and ultraviolet rays in a wavelength of 250–400 nm, then which stores their energies, and which emits the energies as luminescence when it is exposed to irradiation of a visible light or an infrared ray.

One example of the above-mentioned stimulable phosphors is a cerium activated rare earth oxyhalide phosphor which has the following formula (I):

$$LnOX:xCe \quad (I)$$

in which Ln is at least one rare earth element selected from the group consisting Y, La, Gd and Lu; and X is at least one halogen selected from the group consisting Cl, Br and I; and x is a number satisfying the condition of $0 < X \leq 0.2$, as described in Japanese Patent Publication No. 59(1984)-44339.

The expression of LnOX in the above-described formula (I) means that rare earth element Ln, oxygen O and halogen X together compose a matrix crystal whose structure is same as that of PbFCl crystal, and the expression does not mean that the atomic ratio of Ln, O and X is always 1:1:1 in the crystal. For instance, there disclosed is a cerium activated rare earth oxyhalide phosphor in which a ratio between said Ln and said X (i.e., X/Ln) satisfies the condition of $0.500 < X/Ln \leq 0.998$ in U.S. patent application Ser. No. 423,057 (which has been applied for patent by the present applicant). Of course, said phosphor is included in the phosphors expressed by the formula (I).

Figure 2:
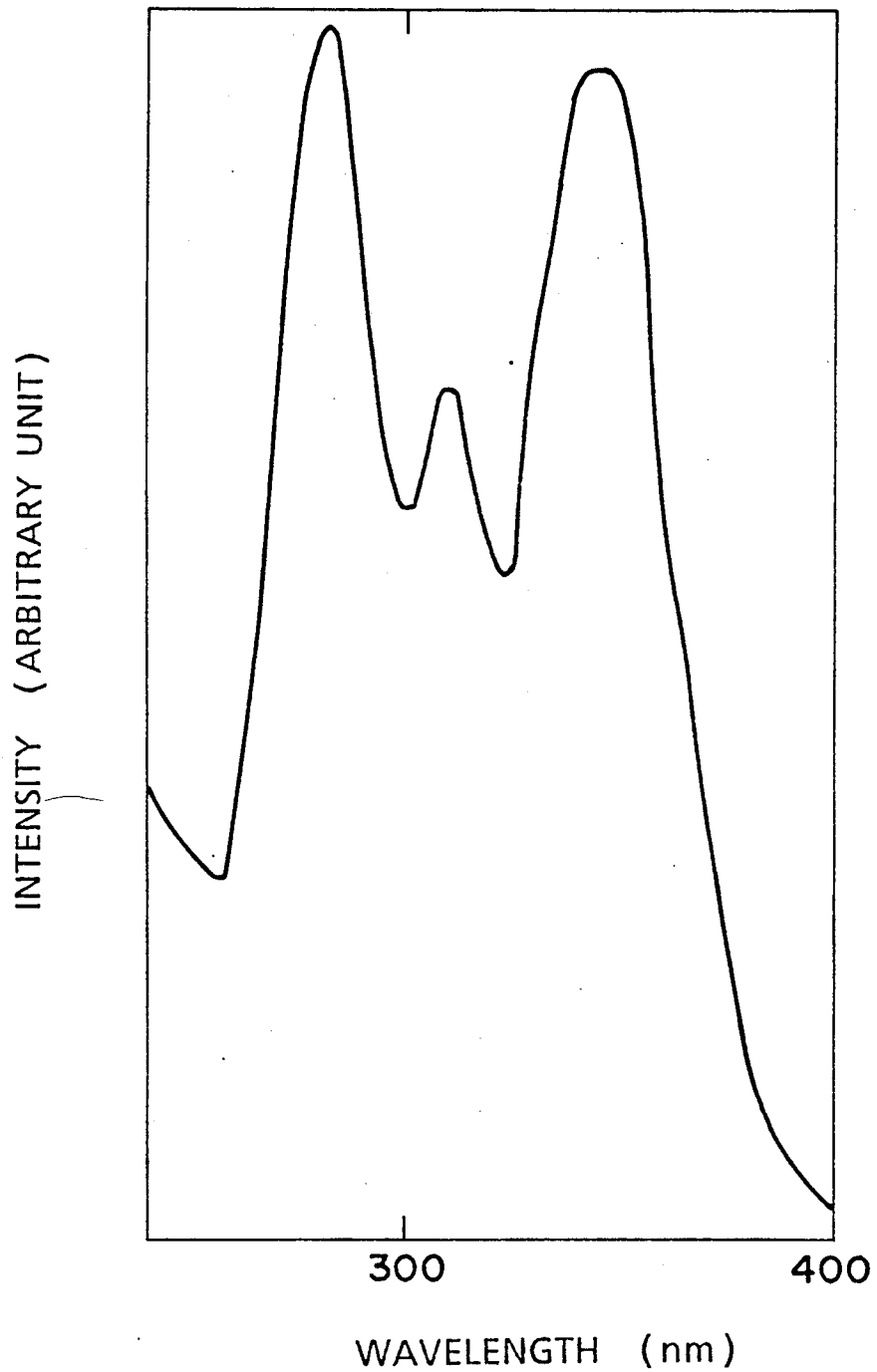
FIG. 2 is the spectrum of LaOBr:Ce phosphor which shows the wavelength dependence of the amount of the light stored by the phosphor.
Figure 3:
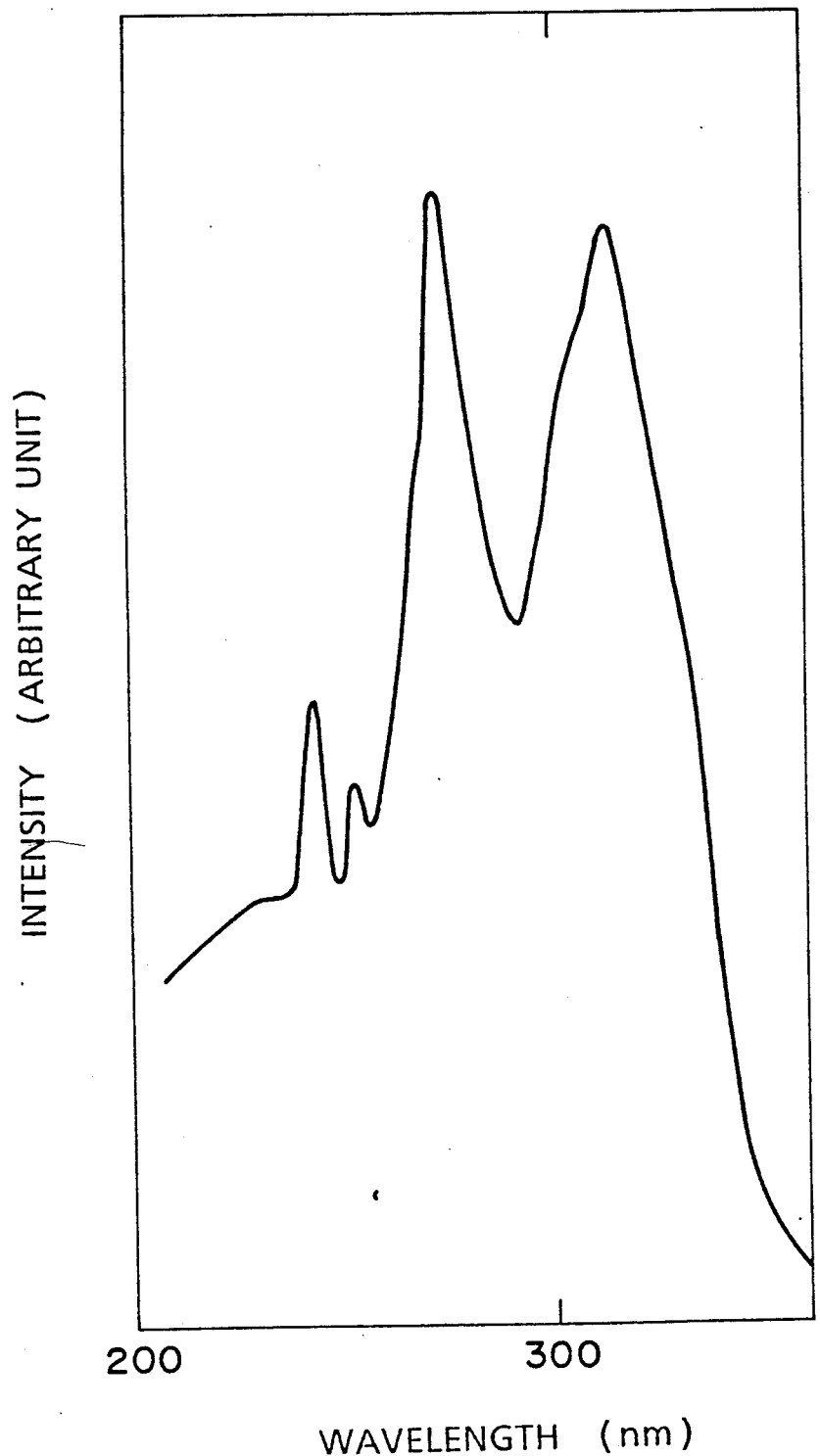
FIG. 3 is the spectrum of GdOCl:Ce phosphor which shows the wavelength dependence of the amount of the light stored by the phosphor.

As concrete examples, there are shown the wavelength dependence of the amount of the light stored by LaOBr:Ce phosphor (i.e., Ln=La, X=Br in the formula (I)) and GdOCl:Ce phosphor (i.e., Ln=Gd, X=Cl in the formula (I)) in FIG. 2 and FIG. 3, respectively. The spectra shown in FIG. 2 and FIG. 3 exhibit the amount of the light which the phosphors absorb and store at a certain wavelength. As is evident from FIG. 2 and FIG. 3, a cerium activated rare earth oxyhalide phosphor expressed by the formula (I) absorbs and stores the energy of the light in the wavelength of 250–400 nm, efficiently. Therefore, said phosphor is preferably employed for the present invention.

The above-mentioned cerium activated rare earth phosphor is by no means given to restrict the stimulable phosphor employable in the present invention. Any other phosphors can be also employed, provided that the phosphor absorbs both a radiation in a wavelength shorter than 250 nm and ultraviolet rays in a wavelength of 250–400 nm, then stores their energies, and emits the energies as luminescence when it is exposed to irradiation of a visible light or an infrared ray.

In the next place, below described is the phosphor which emits ultraviolet rays in a wavelength of 250–400 nm when it is excited by a radiation in a wavelength shorter than 250 nm (i.e., ultraviolet ray emitting phosphor), which is employable in the present invention.

Figure 4:
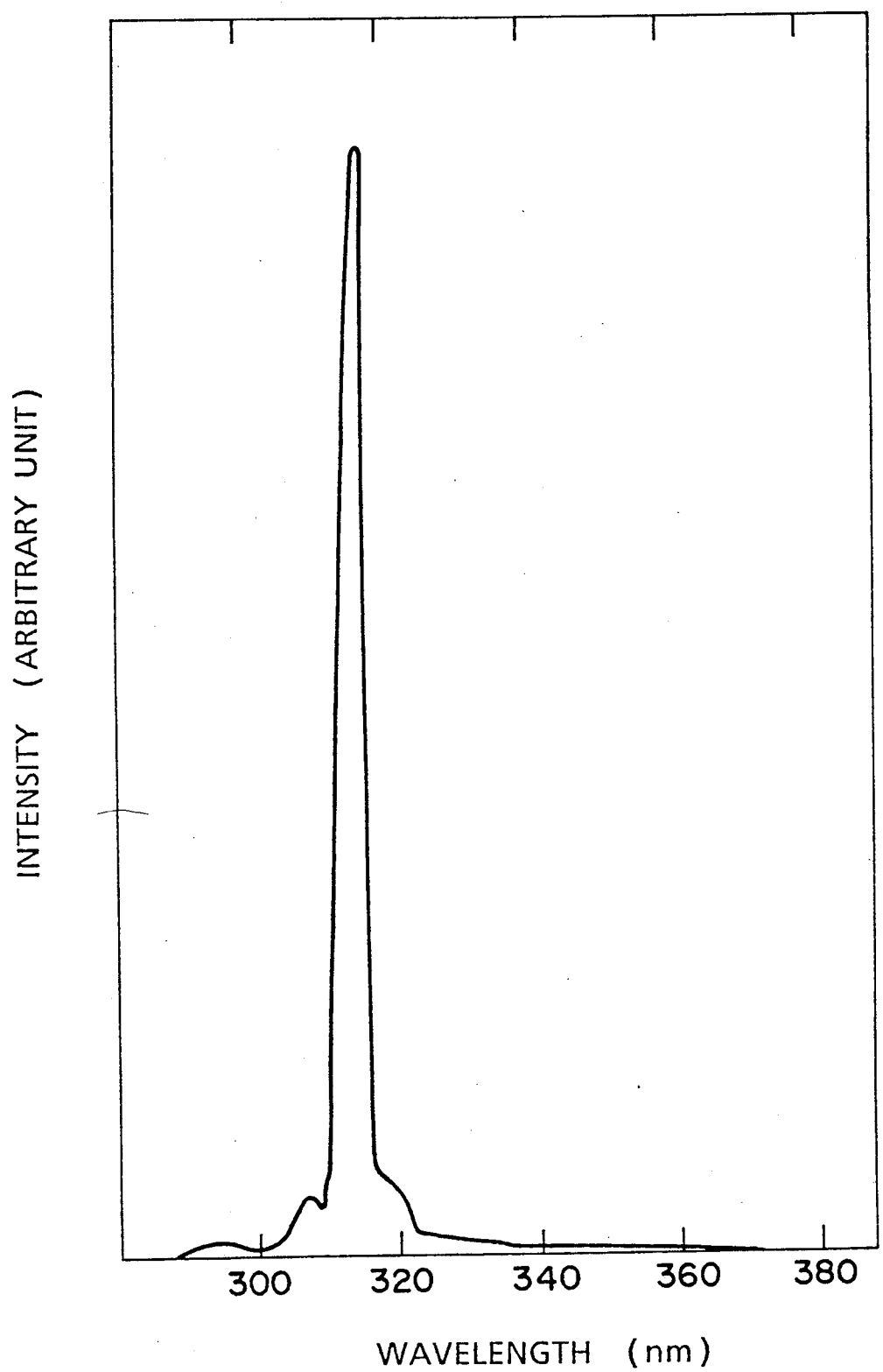
FIG. 4 is the emission spectrum of (Y,Sr)TaO$_4$:Gd phosphor.
Figure 5:
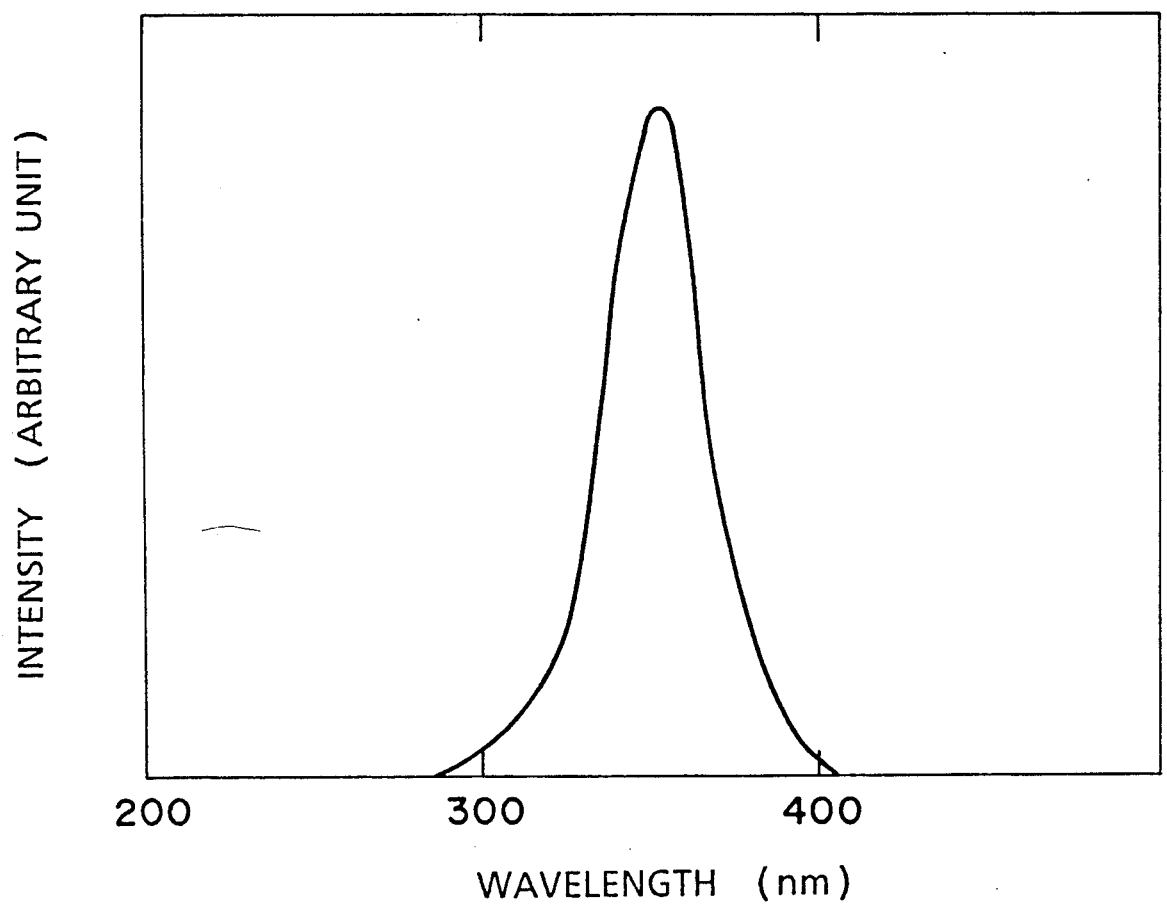
FIG. 5 is the emission spectrum of BaSi$_2$O$_5$:Pb$^{2+}$ phosphor.
Figure 6:
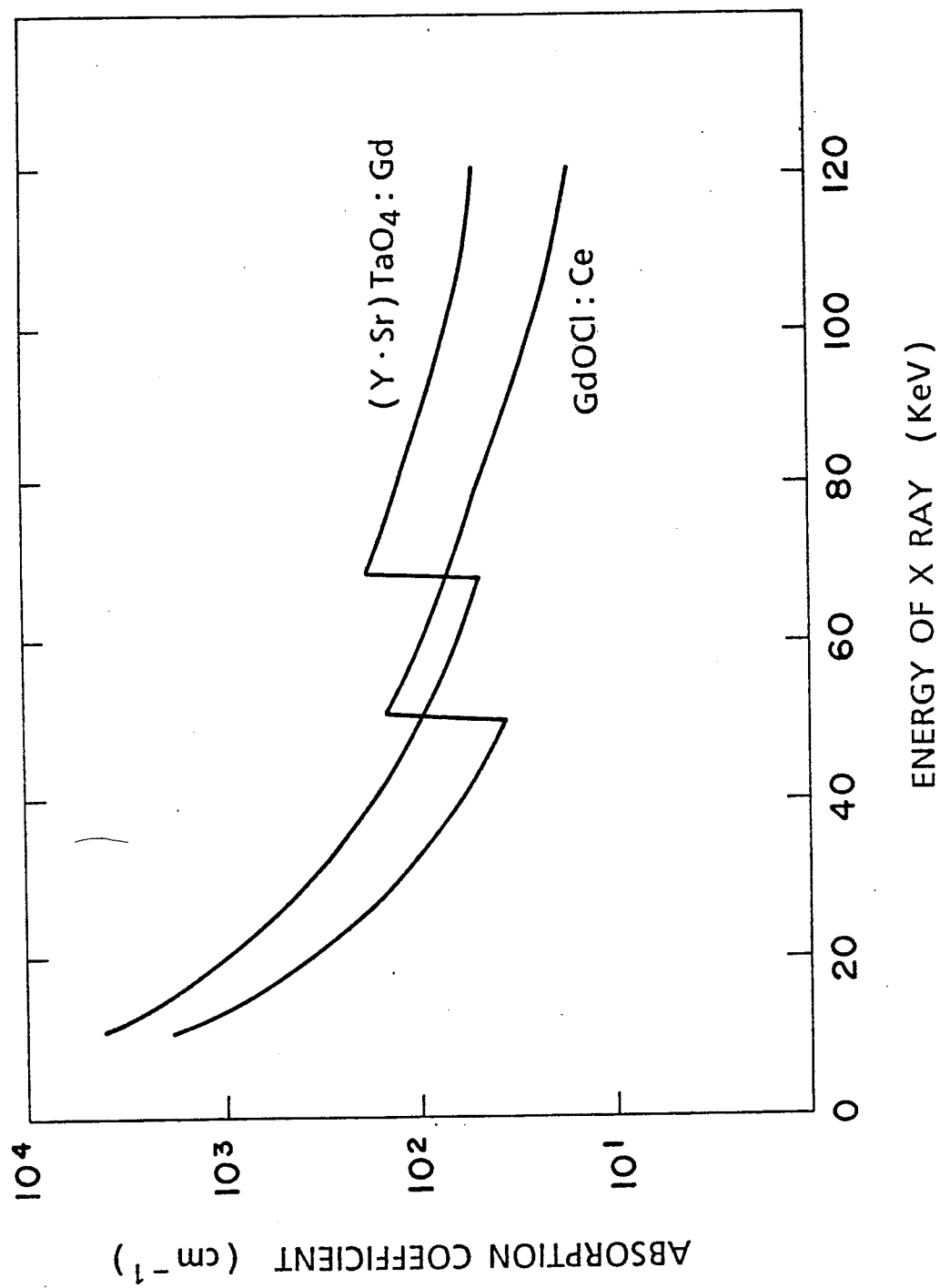
FIG. 6 shows X-ray absorption coefficients of GdOCl:Ce phosphor and (Y,Sr)TaO$_4$:Gd phosphor.

Examples of the ultraviolet ray emitting phosphor include $(Y,Sr)TaO_4:Gd$, $BaSi_2O_5:Pb^{2+}$, $Ca_3(PO_4)_2:Tl$, $(Ca,Zn)_3(PO_4)_2:Tl$ and $(Ba,Zn,Mg)_3SiO_3SiO_2O_7:Pb$. Among the above-described ultraviolet ray emitting phosphors, $(Y,Sr)TaO_4:Gd$ and $BaSi_2O_5:Pb^{2+}$ are particularly preferred, because they have high absorption coefficients. The emission spectra of $(Y,Sr)TaO_4:Gd$ and $BaSi_2O_5:Pb^{2+}$ excited by X-ray are shown in FIG. 4 and FIG. 5, respectively. $(Y,Sr)TaO_4:Gd$ exhibits a sharp emission spectrum at near 315 nm, and $BaSi_2O_5:Pb^{2+}$ exhibits a broad one in a wavelength of 300–400 nm. Therefore, from a view point of emission wavelength region as well as absorption coefficients, they are preferably employed for the present invention.

As the stimulable phosphor layer of the radiation image storage panel of the invention, there can be employed a stimulable phosphor layer comprising a binder and a stimulable phosphor dispersed therein or a stimulable phosphor layer composed of only an agglomerate of a stimulable phosphor not containing a binder. There can be also employed other type of a stimulable phosphor layer in which voids of a stimulable phosphor agglomerate are impregnated with a polymer material.

The radiation image storage panel of the present invention will be described in more detail with respect to an example of the panel comprising a support and a stimulable phosphor layer provided thereon which comprises a binder and a combination of a stimulable phosphor and an ultraviolet ray emitting phosphor dispersed therein.

The stimulable phosphor layer can be formed, for instance, in the manner described below.

The above-described stimulable phosphor, ultraviolet ray emitting phosphor and a binder are added to an appropriate solvent, and they are well mixed to prepare a dispersion in which the stimulable phosphor particles and ultraviolet ray emitting phosphor particles are homogeneously dispersed in a binder solution.

In this step, if the ultraviolet ray emitting phosphor is added too much, the sensitivity of the obtained panel may deteriorate. Because the amount of the stimulable phosphor which stores the energy relatively decreases, while the amount of the ultraviolet ray emitting phosphor increases.

Figure 1:
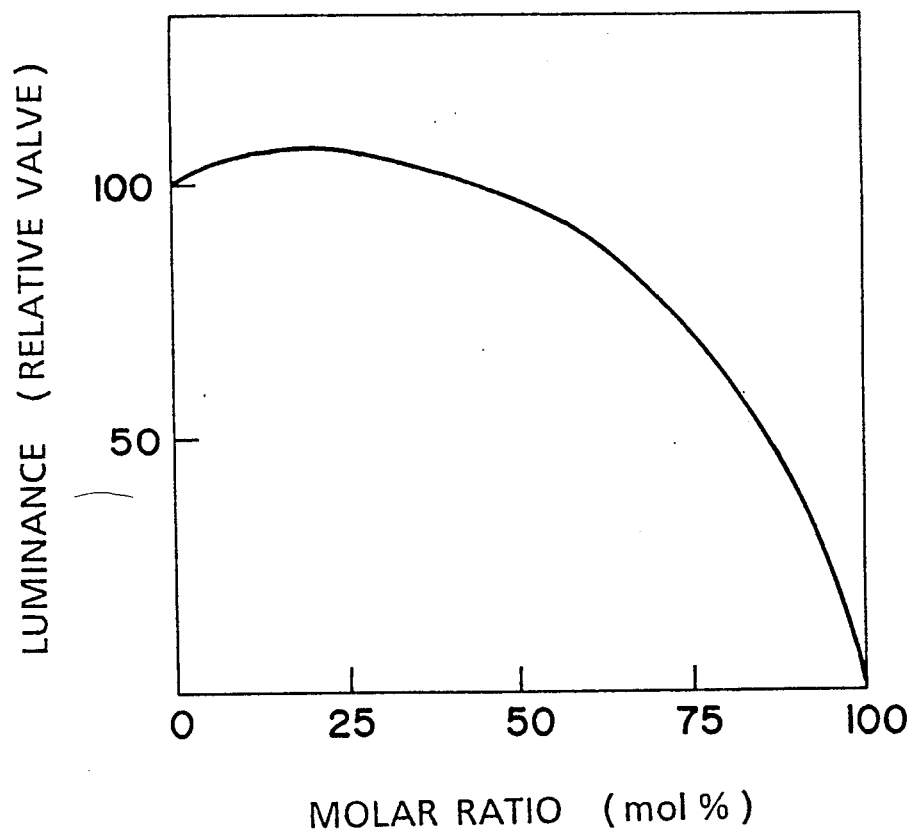
FIG. 1 shows a relation between the luminance of stimulated emission and the mixing ratio of the ultraviolet ray emitting phosphor and stimulable phosphor in the stimulable phosphor layer.

In FIG. 1, there is shown a relation between the luminance of stimulated emission of the panel and the molar ratio of the ultraviolet ray emitting phosphor $(Y,Sr)TaO_4:Gd$ (to the total mole of said ultraviolet ray emitting phosphor and the stimulable phosphor) in the phosphor layer. As is evident from FIG. 1, the luminance of stimulated emission of the panel whose phosphor layer contains the ultraviolet ray emitting phosphor to the amount of more than 0.45 (i.e., 45 mol % by mole percentage) is lower than that of the panel which does not contain the ultraviolet ray emitting phosphor.

The preferable mixing ratio between the stimulable phosphor and the ultraviolet ray emitting phosphor varies depending upon the combination of each phosphor. Generally, the molar ratio of the ultraviolet ray emitting phosphor to the total mole of both phosphors is preferably not more than 0.5 (i.e., 50 mol % by mole percentage).

Examples of the binders include: natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

Examples of the solvents employable in the preparation of the dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether and ethylene glycol monomethyl ether; and mixtures of the above-mentioned compounds.

A ratio between the binder and the total phosphor (i.e., the total amount of the stimulable phosphor and the ultraviolet emitting phosphor) in the coating dispersion may be determined according to the characteristics of the aimed radiation image storage panel and the nature of the phosphors employed. Generally, the ratio therebetween is within the range of from 1:1 to 1:100 (binder:phosphors, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate, and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the stimulable phosphor particles, the ultraviolet ray emitting phosphor particles and the binder prepared as above is applied evenly to the surface of a support to form a layer of the coating dispersion. The coating procedure can be carried out by a conventional method such as a method of using a doctor blade, a roll coater or a knife coater.

In the case of a radiation image storage panel of the present invention having a layer which contains an ultraviolet ray emitting phosphor and which is provided in contact with the bottom surface of the stimulable phosphor layer (i.e., an ultraviolet ray emitting phosphor layer), the ultraviolet ray emitting phosphor layer can be formed in the following manner. The coating dispersion in which ultraviolet ray emitting phosphor particles are dispersed in a binder solution is prepared in the same manner as the above-described dispersion for the formation of the stimulable phosphor layer. The obtained coating dispersion is coated over the support, previous to or simultaneously with coating of the dispersion for the formation of a phosphor layer (which need not include the ultraviolet ray emitting phosphor in this case).

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ceramic sheets such as sheets of alumina, zirconia, magnesia and titania; ordinary papers; baryta paper; resin-coated papers; pigment papers containing titanium dioxide or the like; and papers sized with polyvinyl alcohol or the like.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For example, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support, and the constitution thereof can be optionally selected depending upon the purpose of the radiation image storage panel.

As described in U.S. patent application No. 496,278, the phosphor layer-side surface of the support (or the surface of an adhesive layer, light-reflecting layer, or light-absorbing layer in the case that such layers are provided on the phosphor layer) may be provided with protruded and depressed portions for enhancement of the sharpness of a radiation image.

The coating dispersion(s) is(are) coated over the support as described above. Then the coated layer(s) of the dispersion(s) is(are) dried to complete the formation of a phosphor layer (and an ultraviolet ray emitting phosphor layer) on the support. The thicknesses of the phosphor layers vary depending upon the characteristics of the aimed radiation image storage panel, the nature of the stimulable phosphor, the nature of the ultraviolet ray emitting phosphor, the combination of the stimulable phosphor and the ultraviolet ray emitting phosphor, the ratio between the binder and the phosphor, etc. Generally, the thicknesses of the phosphor layers are within the range of from 20 $\mu$m to 1 mm, preferably from 50 to 500 $\mu$m.

Any of the above-mentioned layers can be provided on the support by the methods other than that given in the above. For example, a layer is initially prepared on a sheet (false support) such as a glass plate, metal plate or plastic sheet using the aforementioned coating dispersion and thus the layer is then overlaid on the genuine support by pressing or using an adhesive agent.

A radiation image storage panel generally has a transparent film on a free surface of a stimulable phosphor layer to physically and chemically protect the phosphor layer. In the panel of the present invention, it is preferable to provide a transparent film for the same purpose.

The transparent protective film can be formed on the stimulable phosphor layer by coating the surface of the stimulable phosphor layer with a solution of a transparent polymer such as a cellulose derivative (e.g. cellulose acetate or nitrocellulose), or a synthetic polymer (e.g. polymethyl methacrylate, poly-vinyl butyral, polyvinyl formal, polycarbonate, polyvinyl acetate, or vinyl chloride-vinyl acetate copolymer), and drying the coated solution. Alternatively, the transparent film can be provided on the stimulable phosphor layer by beforehand preparing a film for forming a protective film from a plastic sheet made of polyethylene terephthalate, polyethylene naphthalate, polyethylene, polyvinylidene chloride or polyamide; or transparent glass sheet, followed by placing and fixing it onto the stimulable phosphor layer with an appropriate adhesive agent.

The protective film and the stimulable phosphor layer can be formed at the same time by sintering an inorganic material for the protective film such as an oxide (e.g. $SiO_2$, $Al_2O_3$), a fluoride (e.g. $MgF_2$) and a carbonate (e.g. SiC), together with a mixture of starting materials for the stimulable phosphor layer. The protective film also can be formed by depositing said materials on the surface of the stimulable phosphor layer, or by heating an inorganic material having a low melting point to melt on the stimulable phosphor layer and coating said melted material on the surface of the stimulable phosphor layer. An inorganic coating reagent is also available for forming the protective film.

If a radiation image storage panel has no support, it is preferred that the protective films are provided on the both surfaces (i.e. the top surface and the bottom surface) of the stimulable phosphor layer.

The transparent protective film generally has a thickness within the range of approximately 0.1 to 20 μm.

In addition to the above-mentioned layers, the radiation image storage panel of the present invention may have a colored layer which absorbs stimulating rays and does not absorb stimulated emission, in order to improve the sharpness of the image provided thereby (see: Japanese Patent Publication No. 59(1984)-23400).

The examples of the present invention and the comparison examples are given below, but the examples are construed by no means to restrict the invention.

EXAMPLE 1

To 10.45 g of 10% solution of polyurethane resin (Crisvone NT-50: available from Dainippon Ink Chem., Co., Ltd.) dissolved in a mixture solvent of methyl ethyl ketone and isopropyl alcohol (methyl ethyl ketone:isopropyl alcohol=7:3) was added 23.4 g of an ultraviolet ray emitting phosphor $(Y,Sr)TaO_4:Gd$ to prepare a coating dispersion in which the ultraviolet ray emitting phosphor was dispersed in the solution. The obtained dispersion was coated on a polyethylene terephthalate film using a doctor blade, and the coated layer of the dispersion was heated to prepare a ultraviolet ray emitting phosphor layer containing the ultraviolet ray emitting phosphor.

Subsequently, to 10.45 g of 10% solution of polyurethane resin dissolved in a mixture solvent of methyl ethyl ketone and isopropyl alcohol (methyl ethyl ketone:isopropyl alcohol=7:3) was added 20.9 g of a stimulable phosphor GdOCl:Ce in the same manner described above, to prepare a coating dispersion. The obtained dispersion was coated on the above-described ultraviolet ray emitting phosphor layer containing the ultraviolet ray emitting phosphor, and the coated layer of the dispersion was heated to prepare a stimulable phosphor layer. Thus, a radiation image storage panel of the present invention was prepared.

EXAMPLE 2

To 10.45 g of 10% solution of polyurethane resin dissolved in a mixture solvent of methyl ethyl ketone and isopropyl alcohol (methyl ethyl ketone:isopropyl alcohol=7:3) was added 7.0 g of an ultraviolet ray emitting phosphor $(Y,Sr)TaO_4:Gd$ and 20.9 g of a stimulable phosphor GdOCl:Ce to prepare a coating dispersion. The obtained dispersion was coated on a polyethylene terephthalate film using a doctor blade, and the coated layer of the dispersion was heated to prepare a stimulable phosphor layer containing $(Y,Sr)TaO_4:Gd$ and GdOCl:Ce. Thus, a radiation image storage panel of the present invention was prepared.

EXAMPLE 3

The procedure of Example 1 was repeated except for using 25.4 g of $BaSi_2O_5:Pb^{2+}$ as an ultraviolet ray emitting phosphor to prepare a radiation image storage panel of the present invention.

COMPARISON EXAMPLE 1

To 10.45 g of 10% solution of polyurethane resin dissolved in a mixture solvent of methyl ethyl ketone and isopropyl alcohol (methyl ethyl ketone:isopropyl alcohol=7:3) was added 20.9 g of a stimulable phosphor GdOCl:Ce to prepare a coating dispersion. The obtained dispersion was coated on a polyethylene terephthalate film using a doctor blade, and the coated layer of the dispersion was heated to prepare a stimulable phosphor layer. Thus, there was prepared, in the same manner described above, a radiation image storage panel which was similar to that of Example 1 except for having no layer containing an ultraviolet ray emitting phosphor.

Evaluation of Radiation Image Storage Panel

There were measured the luminance of stimulated emission of the radiation image storage panels obtained in the above-described Examples and Comparison Example. Each of the panels was exposed to X-ray at 80 KeV for 10 seconds, and after 20 seconds, excited by the light of a He-Ne laser. Then the stimulated emission emitted from the panel was detected.

The results are set forth in Table 1, in which the values are relatively determined on the basis of the luminance of the panel of Comparison Example 1 to be set at 100.

TABLE 1

|  | luminance (relative value) |
|---|---|
| Example 1 | 155 |
| Example 2 | 110 |
| Example 3 | 180 |
| Comparison Example 1 | 100 |

There were also prepared various radiation image storage panels including an ultraviolet ray emitting phosphor $(Y,Sr)TaO_4:Gd$ together with a stimulable phosphor GdOCl:Ce in the stimulable phosphor layers, in which the mixing ratios of both phosphors are varied. By measuring the luminance of stimulated emission of these panels, the relation between the luminance of stimulated emission and the mixing ratio of a stimulable phosphor and an ultraviolet ray emitting phosphor was examined. The result is shown in FIG. 1. In FIG. 1, the molar ratio of the ultraviolet ray emitting phosphor $(Y,Sr)TaO_4:Gd$ (to the total mole of said ultraviolet ray emitting phosphor $(Y,Sr)TaO_4:Gd$ and the stimulable phosphor GdOCl:Ce) is plotted on the abscissa and the luminance on the ordinate.

EXAMPLE 4

The procedure of Example 1 was repeated except for using 23.4 g of LaOBr:Ce as a stimulable phosphor to prepare a radiation image storage panel of the present invention.

Comparison Example 2

The procedures of Comparison Example 1 were repeated except for using 23.4 g of LaOBr:Ce as a stimulable phosphor to prepare a radiation image storage panel which was similar to that of Example 4 except for having no layer containing an ultraviolet ray emitting phosphor.

Evaluation of Radiation Image Storage Panel

There were measured the luminance of stimulated emission of the radiation image storage panels obtained in Example 4 and Comparison Example 2 in the same manner as described before.

The results are set forth in Table 2, in which the values are relatively determined on the basis of the luminance of the panel of Comparison Example 2 to be set at 100.

TABLE 2

|  | luminance (relative value) |
|---|---|
| Example 4 | 165 |
| Comparison Example 2 | 100 |

As is evident from the above-described Examples and Comparison Examples, the radiation image storage panels of the present invention exhibit high luminance of stimulated emission, because their efficiency of absorbing a radiation is considerably increased. Therefore, the radiation image storage panel of the present invention has highly improved sensitivity to a radiation.

We claim:

1. A radiation image storage panel having a phosphor layer; including a stimulable cerium activated rare earth oxyhalide phosphor which has the following formula (I):

$LnOX{:}xCe$ in which Ln is at least one rare earth element selected from the group consisting Y, La, Gd and Lu: and x is at least one halogen selected from the group consisting Cl, Br, and I; and x is a number satisfying the condition of $0 < x \leq 0.2$, which absorbs both a radiation in a wavelength shorter than 250 nm and ultraviolet rays in a wavelength of 250-400 nm, then which stores their energies, and which emits the energies as luminescence when it is exposed to irradiation of a visible light or an infrared ray; and also including a phosphor which emits ultraviolet rays in a wavelength of 250-400 nm when it is excited by a radiation in a wavelength shorter than 250 nm.

2. The radiation image storage panel as claimed in claim 1, in which said phosphor which emits ultraviolet rays in a wavelength of 250-400 nm when it is excited by a radiation in a wavelength shorter than 250 nm is (Y,Sr)TaO$_4$:Gd.

3. The radiation image storage panel as claimed in claim 1, in which said phosphor which emits ultraviolet rays in a wavelength of 250-400 nm when it is excited by a radiation in a wavelength shorter than 250 nm is BaSi$_2$O$_5$:Pb$^{2+}$.

4. The radiation image storage panel as claimed in claim 1, in which the mixing ratio of the phosphor which emits ultraviolet rays in a wavelength of 250-400 nm when it is excited by a radiation in a wavelength shorter than 250 nm to the total mole of said phosphor and the stimulable phosphor in the phosphor layer is not more than 0.5 by molar ratio.

5. A radiation image storage panel having a stimulable phosphor layer including a stimulable phosphor which absorbs both a radiation in a wavelength shorter than 250 nm and ultraviolet rays in a wavelength of 250-400 nm, then which stores their energies, and which emits the energies as luminescence when it is exposed to irradiation of a visible light or an infrared ray; and also having a layer including a phosphor which emits ultraviolet rays in a wavelength of 250-400 nm when it is excited by a radiation in a wavelength shorter than 250 nm, provided in contact with the bottom surface of said stimulable phosphor layer.

6. The radiation image storage panel as claimed in claim 5, in which said stimulable phosphor is a cerium activated rare earth oxyhalide phosphor which has the following formula (I):

$LnOX{:}xCe$ \hfill (I)

in which Ln is at least one rare earth element selected from the group consisting Y, La, Gd and Lu; and X is at least one halogen selected from the group consisting Cl, Br and I; and x is a number satisfying the condition of $0 < X \leq 0.2$.

7. The radiation image storage panel as claimed in claim 5, in which said phosphor which emits ultraviolet rays in a wavelength of 250-400 nm when it is excited by a radiation in a wavelength shorter than 250 nm is (Y,Sr)TaO$_4$:Gd.

8. The radiation image storage panel as claimed in claim 5, in which said phosphor which emits ultraviolet rays in a wavelength of 250-400 nm when it is excited by a radiation in a wavelength shorter than 250 nm is BaSi$_2$O$_5$:Pb$^{2+}$.

* * * * *